Nov. 8, 1949     P. B. WITMER     2,487,745
DOOR LATCH
Filed Oct. 1, 1945     3 Sheets-Sheet 1
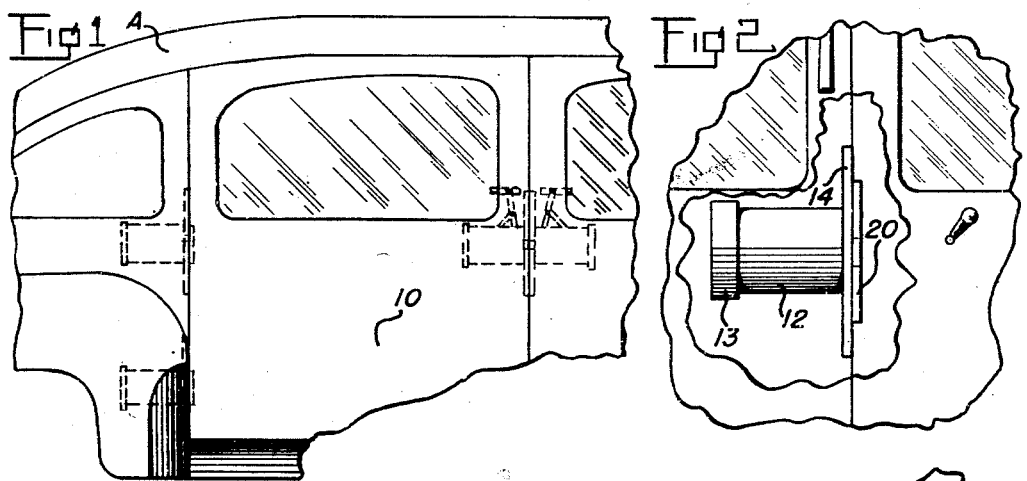
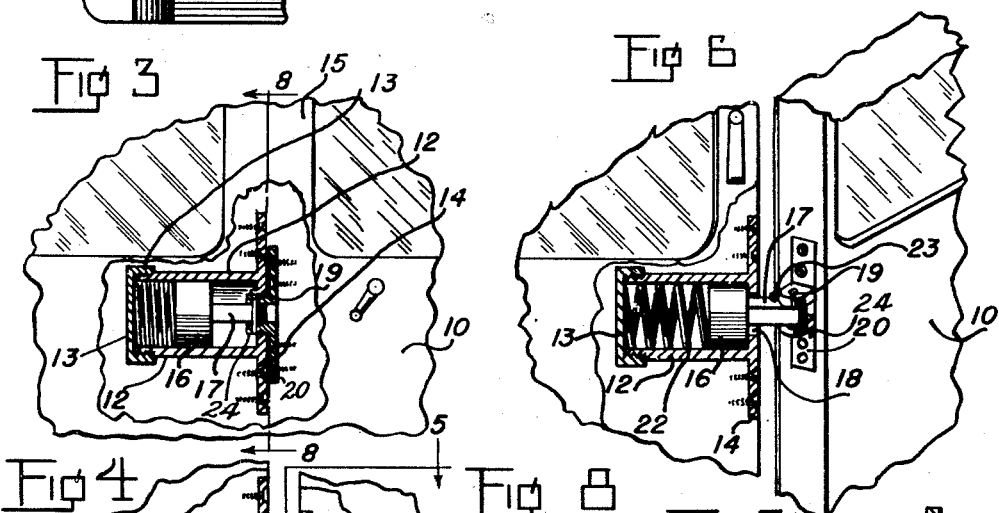
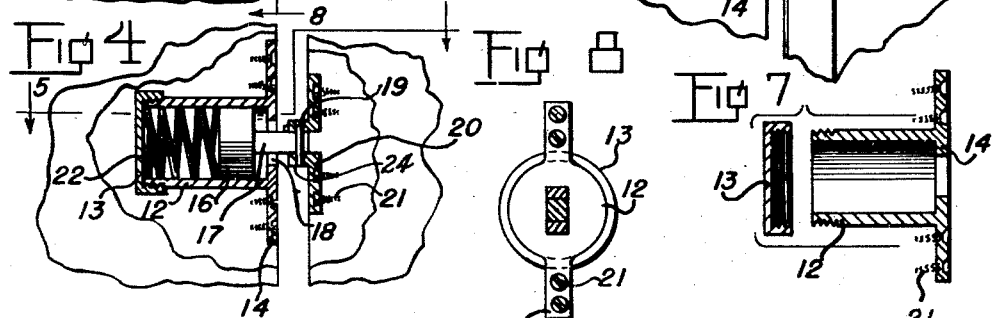
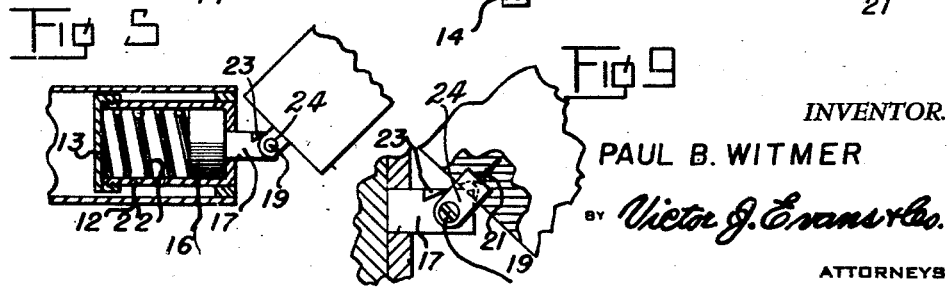
INVENTOR.
PAUL B. WITMER
BY Victor J. Evans & Co.
ATTORNEYS

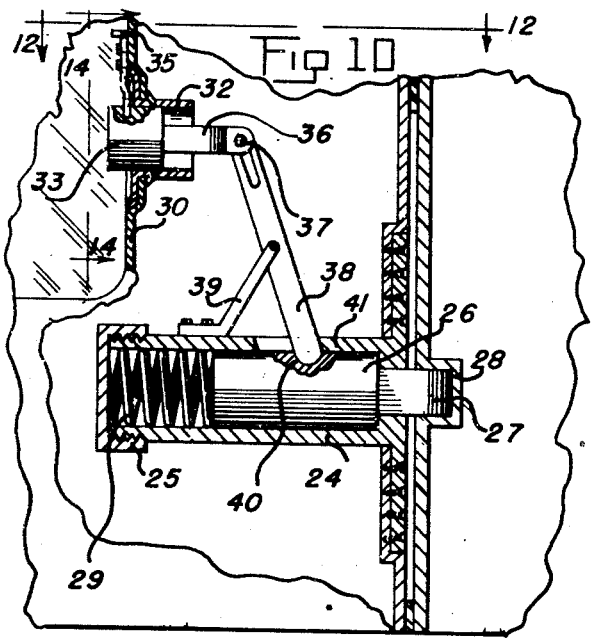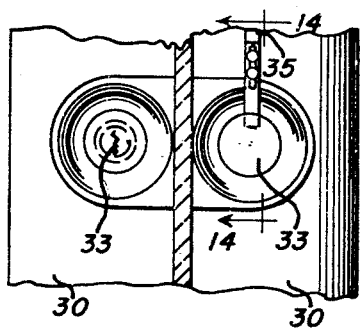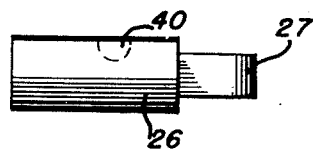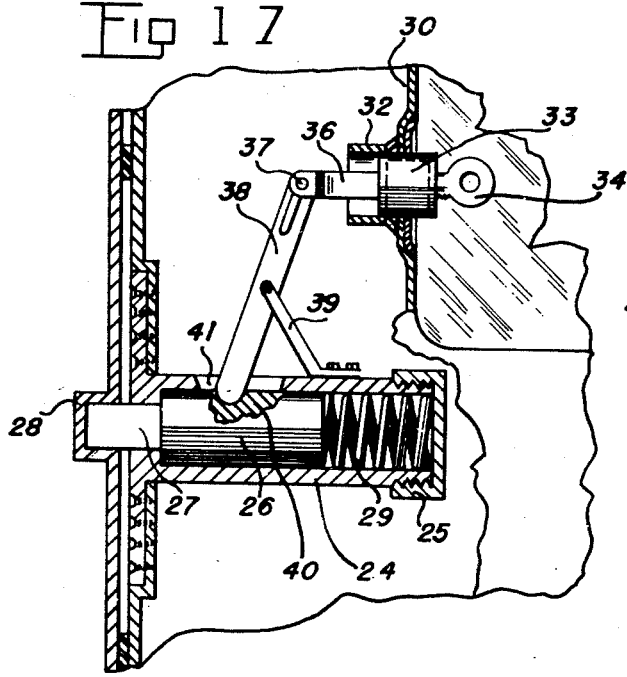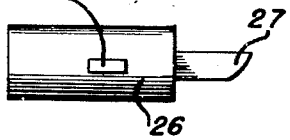

Nov. 8, 1949 P. B. WITMER 2,487,745
DOOR LATCH
Filed Oct. 1, 1945 3 Sheets-Sheet 3
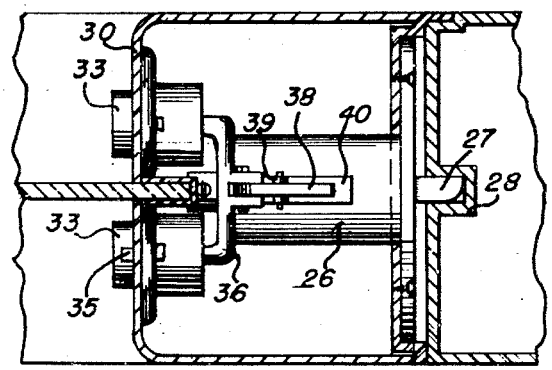
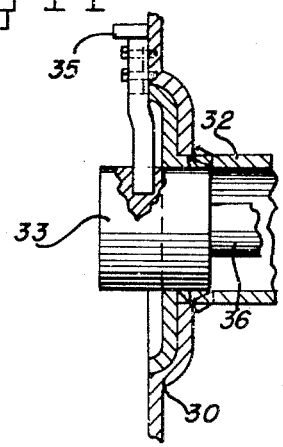
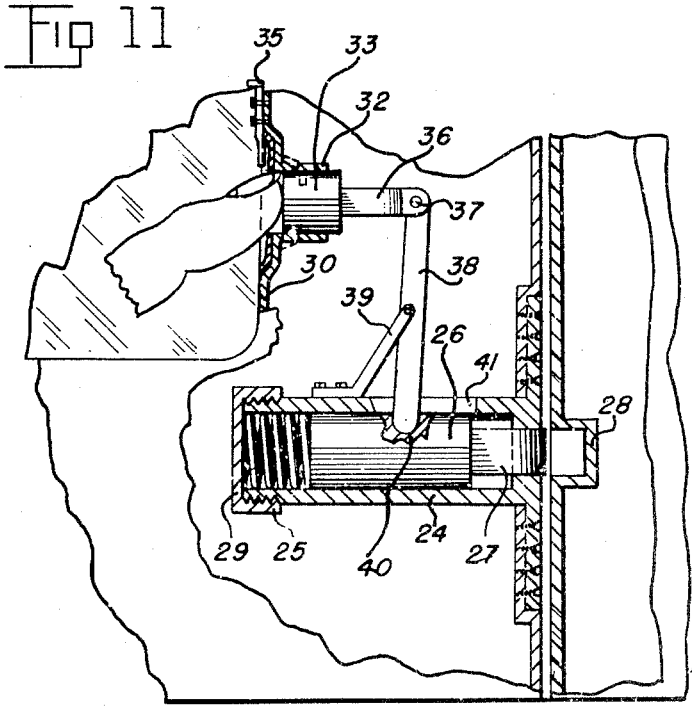
INVENTOR.
PAUL B. WITMER Patented Nov. 8, 1949

2,487,745

UNITED STATES PATENT OFFICE 2,487,745

DOOR LATCH

Paul Baker Witmer, Lancaster, Pa.

Application October 1, 1945, Serial No. 619,483

1 Claim. (Cl. 292—166)

The invention relates to swinging door fittings, and more especially to lock fittings.

The primary object of the invention is the provision of fittings of this character, wherein the swinging door of an automobile body can be hung on displaceable hinge fittings, so that when closed it will be sustained under tension to avoid rattling thereof and maintained tight in such position, the fittings being concealed from view, either interiorly or exteriorly of the body of the vehicle, the door being under tension at all times whether closed or opened.

Another object of the invention is the provision of fittings of this character, wherein the door when closed can be released from latched condition by push-button action, the push buttons being located in the framing of the window panel and are disposed both inwardly and outwardly of such panel for easy access by the user of the vehicle, yet not protruding from the exterior surface of the body of such vehicle to avoid streamline disruption to the latter.

A further object of the invention is the provision of fittings of this character, wherein on the latching of the door the latter can be held in a locked condition to avoid invaders with resultant theft of the vehicle, the fittings being of novel construction and unique in the arrangement of the parts thereof, as well as in the assembling in the vehicle.

A still further object of the invention is the provision of fittings of this character, which are simple in construction, thoroughly reliable and efficient in operation, strong, durable, neat in appearance, readily and easily installed, positive of operation, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 1 is a fragmentary side view of a motor vehicle body showing its horizontally swinging door with the fittings constructed in accordance with the invention applied.

Figure 2 is a similar view on an enlarged scale, partly broken away at the hinge area of the door.

Figure 3 is a sectional view through the hinge fitting with the door closed.

Figure 4 is a view similar to Figure 3 with the door partly open.

Figure 5 is a sectional view taken on the line 5—5 of Figure 4 looking in the direction of the arrows.

Figure 6 is a fragmentary perspective view and the door open.

Figure 7 is an exploded sectional view through the door hinge housing.

Figure 8 is a sectional view taken on the line 8—8 of Figure 3 looking in the direction of the arrows.

Figure 9 is a detail horizontal sectional view at the break-joint of the hinge fitting.

Figure 10 is a view similar to Figure 3 showing the latch fitting with the door closed.

Figure 11 is a view similar to Figure 10 showing the door unlatched.

Figure 12 is a sectional view taken on the line 12—12 of Figure 10 looking in the direction of the arrows.

Figure 13 is a sectional view taken on the line 13—13 of Figure 10 looking in the direction of the arrows.

Figure 14 is a sectional view taken on the line 14—14 of Figure 13 looking in the direction of the arrows.

Figure 15 is a detail plan view of the latch bolt.

Figure 16 is a side elevation thereof.

Figure 17 is a view similar to Figure 10 looking outwardly from within the vehicle body.

Similar reference characters indicate corresponding parts throughout the several views in the drawings.

Referring to the drawings in detail, A designates generally a portion of the body of a motor vehicle having as usual a doorway frame for a horizontally swinging side door 10 provided with a glass panel 11 which is vertically adjustable in the ordinary manner. The door 10 is supported for swinging movement on hinge fittings, each comprising a tubular or cylinder-like housing 12, having a removable cap 13 at its innermost end, and a mounting plate 14 at the outermost end thereof. This housing 12 is countersunk in the frame 15 for the door 10, with the plate 14 flush with the inside edge of the vertical hinge side of the said frame. Working within the housing 12 is a piston 16 having its stem 17 cleared through a hole 18 centrally of the housing in the plate 14, while such stem has pivotal connection 19 with a hinging fixture 20 secured in place counterseated in the hinge edge of the door by fasteners 21. The housing 12 confines therein a coiled expansion spring 22 which acts against the piston 16 urging it outwardly of such housing when the door 10 is moved to an open position. The stem 17 carries a stop 23 with which abuts the bearings 24 of the fixture 20 when the door is moved to an open position, thereby limiting the further outward swing of the same, the piston 16 being fully within the housing when the said door is closed, and then under the action of the spring 22 moves outwardly of such housing when the said door opens. The door 10 is preferably equipped with two hinge fittings, as does appear in Figure 1 of the drawings.

The latch fitting for the door 10 comprises a latching bolt barrel 24 of tubular form having a removable cap 25 at its innermost end, while the bolt 26 working within this barrel has its latching tip or bit 27 cleared through the outermost end of such barrel for engaging a keeper 28 counterseated in the frame for the door at the latching side edge thereof. The bolt 26 is thrown to a latching position by a coiled tensioning spring 29 which is confined within the barrel 24, the tip or bit 27 being snapped into the keeper 28 on the closing of the door 10 for the latching thereof in this position.

Located above the barrel 24 and fixed in the rim framing 30 for the panel 11 at a point next to the latch fitting, both outside and inside relative to such panel, are push button mountings 31 and 32, respectively, having push buttons 33 working therein. The button 33 in the outside mounting 31 is fitted with a key operated lock 34, while the inside button 33 is engaged by a slidable hand throw locking member 35. The push button mountings 31 and 32 are joined together by a yoke 36 to which is connected by a pivot 37 centrally thereof a rocking throw lever or arm 38 bracketed at 39 upon the barrel 24 and notched seated at 40 in the bolt 26 through a slot 41 provided in such barrel 24, so that when either of the buttons 33 are pushed the said bolt can be unlatched, and in this manner freeing the door 10 for the opening thereof.

The button 33 at the outside of the door 10 controls the bolt from the outside of the latter, while the button 33 at the inside of such door controls the bolt at the inside of the latter. The button 33 can be locked against operation by the key lock 34, and the other button 33 is locked by the locking member 35, so that such bolt 26 cannot be released from latching position for safety purposes when the door is closed and latched, as well as locked.

What is claimed is:

In a latch for a swinging door hinged in a door frame having a keeper to coact with said latch, the improvement comprising, a tubular housing, a cover removably mounted on the inner end of said housing to permit access to said housing, an annular flange on the outer end of said housing to mount said housing on the door, a piston shaped latch bolt having a latch bit on its forward end slidably mounted in said tubular housing, a spring in said tubular housing engaging said cover and the rear end of said bolt for the tensioning of said bolt, a notch in said bolt adjacent said forward end thereof, said housing having a slot therein in alinement with said notch, a bracket fixed to said tubular housing adjacent the rear end of said slot, a rocking throw lever pivotedly mounted in said bracket and extending through the slot in said tubular housing at its lower end to engage the notch in said bolt, a yoke pivotedly connected to the upper end of said lever, and push button means on the yoke and so positioned that said bolt by the manipulation of said push button means may be unlatched either on the interior or exterior side of said door.

PAUL BAKER WITMER.

REFERENCES CITED

The following references are of record in the file of this patent:

UNITED STATES PATENTS

| Number | Name | Date |
|---|---|---|
| 502,789 | Tobey | Aug. 8, 1893 |
| 1,056,731 | Billings | Mar. 18, 1913 |
| 1,191,470 | Roberts | July 18, 1916 |
| 1,265,915 | Hitchcock | May 14, 1918 |
| 1,467,124 | Sunde et al. | Sept. 4, 1923 |
| 1,490,777 | La Fortune | Apr. 15, 1924 |
| 2,020,035 | Marchesand | Nov. 5, 1935 |
| 2,366,934 | Schlage | Jan. 9, 1945 |